United States Patent
Li

(10) Patent No.: US 10,123,264 B2
(45) Date of Patent: Nov. 6, 2018

(54) METHOD, TERMINAL AND NETWORK-SIDE ACCESS DEVICE FOR REPORTING PLMN

(71) Applicant: BAICELLS TECHNOLOGIES CO. LTD., Haidian District, Beijing (CN)

(72) Inventor: Wei Li, Beijing (CN)

(73) Assignee: BAICELLS TECHNOLOGIES CO. LTD (CN)

( * ) Notice: Subject to any disclaimer, the term of this patent is extended or adjusted under 35 U.S.C. 154(b) by 0 days.

(21) Appl. No.: 15/630,197

(22) Filed: Jun. 22, 2017

(65) Prior Publication Data

US 2017/0289904 A1 Oct. 5, 2017

Related U.S. Application Data

(63) Continuation of application No. PCT/CN2015/082020, filed on Jun. 23, 2015.

(30) Foreign Application Priority Data

Dec. 22, 2014 (CN) .......................... 2014 1 0806990

(51) Int. Cl.
*H04W 48/18* (2009.01)
*H04L 5/00* (2006.01)
(Continued)

(52) U.S. Cl.
CPC ............ *H04W 48/18* (2013.01); *H04L 5/0053* (2013.01); *H04L 61/1588* (2013.01); *H04W 48/12* (2013.01); *H04W 84/042* (2013.01)

(58) Field of Classification Search
CPC ... H04W 48/18; H04W 48/16; H04W 84/042; H04W 48/02; H04W 88/02; H04W 88/16;
(Continued)

(56) References Cited

U.S. PATENT DOCUMENTS 9,288,750 B2* 3/2016 Tuli ...................... H04W 48/02
9,743,453 B2* 8/2017 Kim .................... H04W 76/027
(Continued)

FOREIGN PATENT DOCUMENTS

CN 101646226 A 2/2010
CN 103546919 A 1/2014
(Continued)

OTHER PUBLICATIONS

International Search Report to corresponding PCT apptication No. PCT/CN2015/082020, dated Aug. 26, 2015, 4 pages.

*Primary Examiner* — Diane Mizrahi
(74) *Attorney, Agent, or Firm* — Calfee Halter & Griswold LLP

(57) ABSTRACT

The present invention discloses a method, a terminal and a network-side access device for reporting PLMN. The method includes: receiving, by a terminal, a PLMN identifier list sent by a network-side access device; selecting, by the terminal, a first PLMN identifier from the PLMN identifier list, so as to connect with the network-side access device; and after the terminal is connected with the network-side access device, labeling, by the terminal, a second PLMN identifier preset in the terminal as a selected PLMN identifier and reporting the selected PLMN identifier to the network-side access device, wherein the first PLMN identifier is different from the second PLMN identifier. The present invention solves the technical problem of limitation of operation on PLMN reporting due to adopting the conventional PLMN reporting manner.

22 Claims, 4 Drawing Sheets

(51) Int. Cl.
*H04L 29/12* (2006.01)
*H04W 48/12* (2009.01)
*H04W 84/04* (2009.01)

(58) Field of Classification Search
CPC ..... H04L 5/0053; H04L 5/14; H04L 61/1588; H04L 61/20; H04L 61/2007; H04L 61/3095
See application file for complete search history.

(56) References Cited

U.S. PATENT DOCUMENTS

| | | | |
|---|---|---|---|
| 2015/0163659 A1* | 6/2015 | Tuli | H04W 48/02 370/328 |
| 2016/0142969 A1* | 5/2016 | Hedman | H04W 36/0022 370/331 |
| 2017/0257886 A1* | 9/2017 | Adjakple | H04W 12/08 |

FOREIGN PATENT DOCUMENTS

| | | |
|---|---|---|
| CN | 103702334 A | 4/2014 |
| WO | 2011157292 A1 | 12/2011 |

* cited by examiner

METHOD, TERMINAL AND NETWORK-SIDE ACCESS DEVICE FOR REPORTING PLMN

CROSS-REFERENCE TO RELATED APPLICATIONS

The present application is a continuation of International Application No. PCT/CN2015/082020, filed on Jun. 23, 2015, which claims the benefit of priority to Chinese Patent Application No. 201410806990.8, filed on Dec. 22, 2014, the contents of both of which are incorporated herein by reference in their entireties.

TECHNICAL FIELD

The present invention relates to the field of communications and, in particular, to a method, a device and a network-side access device for reporting PLMN.

BACKGROUND

A current mobile communication system may have more than one operator in a certain country or district, the operators are distinguished from each other through an operator identifier public land mobile network (Public Land Mobile Network, PLMN). The operator identifier PLMN includes two portions, i.e., a mobile country code (Mobile Country Code, MCC, with a length of 3 bits) and a mobile network code (Mobile Network Code, MNC, with a length of 2-3 bits). In a mobile communication system, PLMN is generally sent to a user terminal in a system message through broadcast, for the user terminal to select and access. At the user terminal side, a subscriber identity module (Subscriber Identity Module, SIM) card is configured to store the PLMN of the operator of the user, the PLMN is configured for the user to identify and access a wireless network.

Further, under a condition that a plurality of operators is available, for a same district, different operators will build a large number of wireless communication infrastructures (e.g., base station antennas) of their own. As a result, many infrastructures may be redundant, for example, at a same site, all operators may have their own base station facilities, thereby increasing operating cost. Moreover, if an unlicensed frequency band can be used for communication, then different operators need to conduct communication in the unlicensed frequency band, under such circumstances, there is a problem that the signals from different operators may interfe re with each other.

At present, network sharing is an important method to solve the problem of redundant wireless communication infrastructures, its main concept lies in that, when multiple operators (e.g. Operator A, Operator B and Operator C shown in FIG. 1) are maintaining their own core network, they can share an access-side network device, FIG. 1 is a schematic view of a network structure for network sharing according to the prior art. The access-side network device includes, but is not limited to, NodeB, radio network controller (Radio Network Controller, RNC), evolved NodeB (eNodeB) etc.

However, it should be noted that, in the current mobile communication system, considering the processing capacity and complexity of hardware at a user terminal, the same access-side network device only supports sharing of at most 6 operators at a certain cell frequency point. Therefore, the PLMN list included in the system message at a certain cell has a maximum length of 6. However, with more and more operator licenses being issued, and more and more Internet content providers being anticipated in mobile Internet, there is increasing needs on network sharing. As a result, for a cell frequency point, there may be more than 6 operators having needs on sharing of network nodes, if only the manner provided by the prior art is adopted, that is, selecting from the PLMN list a PLMN identifier matching with the PLMN preset in the terminal, then the communication of an operator not in the list will be affected seriously.

That is to say, limited by the conventional solution, if more operators have needs on network sharing, it is necessary to increase the number of PLMN broadcast in the system message, or increasing the number of working frequency points of the access-side device supporting network sharing. However, for the first manner, the technical standards of the current mobile communication system shall be modified, which also has higher requirements on hardware of the user terminal and increases complexity. For the second manner, if there is a small number of user terminals but a large number of operators, still more frequency resources need to be occupied, and more network devices need to be used, which leads to a waste of frequency resources and energy. In other words, in the prior art, with the increasing number of virtual operators, the current PLMN reporting manner will be constrained in many aspects, resulting in technical problem of limitation of operation on PLMN reporting, and there is no effective solution provided yet.

SUMMARY

Embodiments of the present invention provide a method, a terminal and a network-side access device for reporting PLMN, so as to solve the technical problem of limitation of operation on PLMN reporting due to adopting the conventional PLMN reporting manner.

An aspect of the present invention provides a method for reporting PLMN, including steps of: receiving, by a terminal, a PLMN identifier list sent by a network-side access device; selecting, by the terminal, a first PLMN identifier from the PLMN identifier list, so as to connect with the network-side access device; and after the terminal is connected with the network-side access device, labeling, by the terminal, a second PLMN identifier preset in the terminal as a selected PLMN identifier and reporting the selected PLMN identifier to the network-side access device, wherein the first PLMN identifier is different from the second PLMN identifier.

Alternatively, the step of selecting, by the terminal, a first PLMN identifier from the PLMN identifier list, so as to connect with the network-side access device, includes: selecting, by the terminal, a first PLMN identifier from the PLMN identifier list according to a preset priority, so as to access the network-side access device.

Alternatively, the step of labeling, by the terminal, a second PLMN identifier preset in the terminal as a selected PLMN identifier and reporting the selected PLMN identifier to the network-side access device, includes: setting, by the terminal, a preset bit in a reporting signaling satisfying a preset format for indicating the selected PLMN identifier as a specific value, wherein the specific value is configured to indicate a position of the second PLMN identifier in the signaling; and reporting, by the terminal, the signaling carrying the second PLMN identifier and the preset bit to the network-side access device.

Alternatively, the position of the second PLMN identifier in the signaling indicated by the specific value includes: a position after the preset bit in the reporting signaling, wherein the position is configured to identify the reported second PLMN identifier.

Alternatively, the step of labeling, by the terminal, a second PLMN identifier preset in the terminal as a selected PLMN identifier and reporting the selected PLMN identifier to the network-side access device, includes: setting, by the terminal, the selected second PLMN identifier at an extensible position in a reporting signaling satisfying a preset format; and reporting, by the terminal, the signaling carrying the second PLMN identifier to the network-side access device.

Alternatively, the first PLMN identifier is configured to allow access of a terminal which is identified by at least two operators.

Another aspect of the present invention further provides a method for reporting PLMN, including steps of: sending, by a network-side access device, a PLMN identifier list to a terminal, wherein the PLMN identifier list at least includes a first PLMN identifier; after the network-side access device is connected with the terminal through the first PLMN identifier, receiving, by the network-side access device, a PLMN identifier reported by the terminal and labeled as being selected by the terminal; judging, by the network-side access device, whether the received PLMN identifier reported by the terminal and labeled as being selected by the terminal is a second PLMN identifier, wherein the second PLMN identifier is not in the PLMN identifier list sent by the network-side access device; and if it is judged that the received PLMN identifier is the second PLMN identifier, sending, by the network-side access device, a received signaling from the terminal to a core network corresponding to the second PLMN identifier.

Alternatively, the step of judging, by the network-side access device, the PLMN identifier reported by the terminal, includes: receiving and analyzing, by the network-side access device, a signaling satisfying a preset format reported by the terminal, so as to acquire a specific value on a preset bit indicating a position of the second PLMN identifier in the signaling.

Alternatively, the position of the second PLMN identifier in the signaling indicated by the specific value includes: a position after the preset bit in the reporting signaling, wherein the position is configured to identify the reported second PLMN identifier.

Alternatively, the step of judging, by the network-side access device, the PLMN identifier reported by the terminal, includes: receiving and analyzing, by the network-side access device, a signaling satisfying a preset format reported by the terminal, so as to acquire the second PLMN identifier reported by the terminal at an extensible position of the signaling.

Alternatively, the PLMN identifier list is sent by the network-side access device on an unlicensed frequency band.

Another aspect of the present invention further provides a terminal for reporting PLMN, including: a receiving module, configured to receive a PLMN identifier list sent by a network-side access device; a connecting module, configured to select a first PLMN identifier from the PLMN identifier list, so as to connect with the network-side access device; and a reporting module, configured to, after the terminal is connected with the network-side access device by the connecting module, label a second PLMN identifier preset in the connecting module as a selected PLMN identifier and report the selected PLMN identifier to the network-side access device, wherein the first PLMN identifier is different from the second PLMN identifier.

Alternatively, the connecting module includes: an access unit, configured to select a first PLMN identifier from the PLMN identifier list according to a preset priority, so as to access the network-side access device.

Alternatively, the reporting module includes: a first setting unit, configured to set a preset bit in a reporting signaling satisfying a preset format for indicating the selected PLMN identifier as a specific value, wherein the specific value is configured to indicate a position of the second PLMN identifier in the signaling; and a first reporting unit, configured to report the signaling carrying the second PLMN identifier and the preset bit to the network-side access device.

Alternatively, the position of the second PLMN identifier in the signaling indicated by the specific value includes: a position after the preset bit in the reporting signaling, wherein the position is configured to identify the reported second PLMN identifier.

Alternatively, the reporting module further includes: a second setting unit, configured to set the second PLMN identifier at an extensible position in a reporting signaling satisfying a preset format; and a second reporting unit, configured to report the signaling carrying the second PLMN identifier to the network-side access device.

Alternatively, the first PLMN identifier is configured to allow access of a term inal which is identified by at least two operators.

Another aspect of the present invention further provides a network-side access device for reporting PLMN, including: a first sending module, configured to send a PLMN identifier list to a terminal, wherein the PLMN identifier list at least includes a first PLMN identifier; a first receiving module, configured to, after the network-side access device is connected with the terminal through the first PLMN identifier, receive a PLMN identifier reported by the terminal and labeled as being selected by the terminal; a judging module, configured to judge whether the received PLMN identifier reported by the terminal and labeled as being selected by the terminal is a second PLMN identifier, wherein the second PLMN identifier is not in the PLMN identifier list sent by the first sending module; and a second sending module, configured to, after the judging module judges that the received PLMN identifier is the second PLMN identifier, send a received signaling from the terminal to a core network corresponding to the second PLMN identifier.

Alternatively, the judging module includes: a first analyzing unit, configured to receive and analyze a signaling satisfying a preset format reported by the terminal, so as to acquire a specific value on a preset bit indicating a position of the second PLMN identifier in the signaling.

Alternatively, the position of the second PLMN identifier in the signaling indicated by the specific value includes: a position after the preset bit in the reporting signaling, wherein the position is configured to identify the reported second PLMN identifier.

Alternatively, the judging module includes: a second analyzing unit, configured to receive and analyze a signaling satisfying a preset format reported by the terminal, so as to acquire the second PLMN identifier reported by the terminal at an extensible position of the signaling.

Alternatively, the PLMN identifier list is sent by the first sending module on an unlicensed frequency band.

In embodiments of the present invention, through the terminal selecting a first PLMN identifier from a PLMN identifier list sent by a network-side access device, and after the terminal is connected with the network-side access device, labeling a second PLMN identifier preset in the terminal as a selected PLMN identifier and reporting the selected PLMN identifier to the network-side access device, so as to interact with the core network corresponding to the second PLMN identifier, the first PLMN identifier is different from the second PLMN identifier. Through the manner of selecting the first PLMN identifier and reporting the second PLMN identifier, during the process of connecting with the network-side access device, the terminal will not be limited by the PLMN list sent by the network-side access device, thereby extending the range of the reported PLMN identifier that can be selected by the terminal, increasing the number of operators that can be connected by the terminal, overcoming the problem of limitation of operation on PLMN reporting due to adopting the conventional PLMN reporting manner and satisfying the needs of increasing number of virtual operators in the prior art.

Furthermore, in the process of reporting PLMN using the above method for reporting PLMN, there is no need to change the hardware capacity, so that the efficiency of PLMN reporting can be increased while reducing operation complexity of the PLMN reporting, thereby saving interaction time between the terminal and the network-side access device.

BRIEF DESCRIPTION OF DRAWINGS

Drawings which constitute a part of the present invention are used to provide further comprehension of the present invention, exemplary embodiments of the present invention and their illustration are used to explain the present invention, which cannot limit the present invention. In the figures.

DESCRIPTION OF EMBODIMENTS

It should be noted that, embodiments and features thereof in the present invention can be combined with each other, unless conflict exists. The present invention will be illustrated in detail with reference to the drawings and embodiments.

In order for those skilled in the art to better understand the present invention, the technical solutions in the embodiments of the present invention will be described clearly and completely with reference to the drawings in the embodiments of the present invention. Obviously, the described embodiments are only a part of the embodiments, rather than all of them. Based on the embodiments of the present invention, any other embodiments obtained by those of ordinary skill in the art shall fall in the protection scope of the present invention.

It should be noted that, the expression "first", "second" used in the specification, claims and drawings are intended to distinguish similar objects, rather than limiting their specific sequence or order. It should be understood that, data used herein can be interchanged under suitable conditions, so as to describe the embodiments of the present invention. Moreover, expression "include", "comprise", "have" and all of their variations shall be interpreted as nonexclusive containing, for example, containing process, method, system, product or device with a series of steps or units, it is not necessary to list these steps or units, but be interpreted as including other inherent steps or unit in these process, method, product or device.

Embodiment 1

It should be noted that, Embodiment 1 and Embodiment 2 are illustrated at terminal side, the terminal can include, but is not limited to, television (TV)/set top box (STB), smart cellphone, PAD, family smart terminal. The above only shows examples, which does not constitute limitation.

Figure 1:
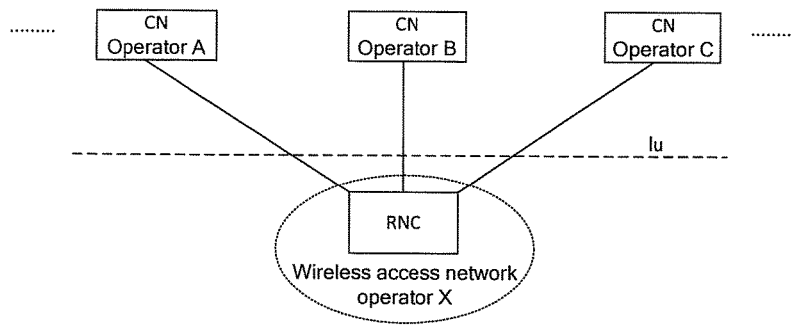
FIG. 1 is a schematic view of a network structure for network sharing according to the prior art.
Figure 2:
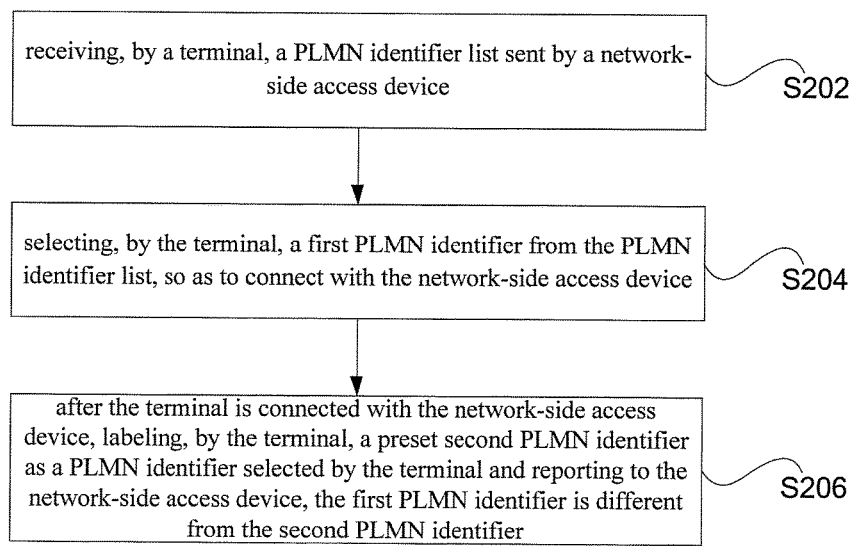
FIG. 2 is a flow diagram of an optional method for reporting PLMN according to an embodiment of the present invention.

An embodiment of the present invention provides a method for reporting PLMN. FIG. 2 is a flow diagram of an optional method for reporting PLMN according to an embodiment of the present invention. As shown in FIG. 2, the method for reporting PLMN includes steps as follows:

Step S202, receiving, by a terminal, a PLMN identifier list sent by a network-side access device;

Step S204, selecting, by the terminal, a first PLMN identifier from the PLMN identifier list, so as to connect with the network-side access device;

Step S206, after the terminal is connected with the network-side access device, labeling, by the terminal, a preset second PLMN identifier as a PLMN identifier selected by the terminal and reporting the selected PLMN identifier to the network-side access device, the first PLMN identifier is different from the second PLMN identifier.

Alternatively, in the present embodiment, the above method for reporting PLMN can be applied to, but is not limited to, a network sharing process, through sharing a PLMN identifier by multiple operators, when the terminal accesses the network-side access device by selecting the first PLMN identifier, the first PLMN identifier can be shared by different operators, and after the shared first PLMN identifier is selected, the preset second PLMN identifier is reported, so that the terminal can interact with the core network corresponding to the second PLMN identifier, thereby solving the technical problem of limitation of operation on PLMN reporting in the prior art, extending the range of the reported PLMN identifier that can be selected by the terminal, increasing the number of operators that can be connected by the terminal, and satisfying the needs of increasing number of virtual operators in the prior art. Alternatively, in the above embodiment, the first PLMN identifier can be configured by the core network or the operator and maintenance center, which is not limited herein.

It should be noted that, the above manner can allow multiple operators to share a PLMN identifier, which not only increases the number of operators that can be connected by the terminal, but also does not increase the operation complexity of the reporting operation, thereby achieving a high efficient PLMN reporting so that the terminal can interact with the core network corresponding to the PLMN, under the condition that the number of the virtual operators is increasing continuously.

In the above step S204, there may be a plurality of implementing manners for the terminal to select the first PLMN identifier from the PLMN identifier list to connect with the network-side access device, for example, selecting the first PLMN identifier from the PLMN identifier list according to a preset priority to access the network-side access device. By adopting such a manner, it is convenient for the terminal to identify the first PLMN identifier, and perform selection and access.

Step S206 can also have a plurality of implementing manners. Two optional implementing manners are taken as examples to illustrate the implementation of step S206.

In an alternative embodiment, the terminal can, but is not limited to, set a preset bit in the reporting signaling satisfying a preset format for indicating the selected PLMN identifier as a specific value, the specific value is configured to indicate the position of the second PLMN identifier in the signaling. Then the terminal reports the signaling carrying the second PLMN identifier and the preset bit to the network-side access device. The terminal reports the selected second PLMN identifier to the network-side access device, thereby achieving the conversion from accessing the network-side access device using the first PLMN identifier to communicating with the network using the second PLMN identifier. Through setting a specific value for the preset bit of the reporting signaling, the network-side is indicated that the terminal will use the selected second PLMN identifier, and multiplex the reporting signaling, so as to indicate the position of the second identifier, thereby saving system resources.

For the above optional embodiments, the position of the second PLMN identifier in the signaling indicated by the specific value can include, but not limited to, a position after the preset bit in the reporting signaling, the signaling at said position is configured to identify the reported second PLMN identifier. By using the position after the preset bit in the reporting signaling, the second PLMN identifier selected by the terminal is identified, thereby achieving multiplex of the reporting signaling, and saving system resources.

In another alternative embodiment, the terminal can, but is not limited to, set the second PLMN identifier selected by the terminal at an extensible position in the reporting signaling satisfying a preset format, then the terminal reports the signaling carrying the second PLMN identifier to the network-side access device. Through extending at the extensible position of the reporting signaling, and identify the second PLMN identifier at the extensible position, the network-side access device can directly acquire the second PLMN identifier selected by the terminal and, at the same time, multiplex of the reporting signaling is achieved, thereby saving system resources.

In the above embodiments, the first PLMN identifier can be, but not limited to, a public PLMN identifier, configured to allow access of a terminal identified by at least two operators, so that different operators can use a same PLMN identifier, thereby solving the problem that when there are more than 6 operators, there is no enough space in the PLMN list.

Embodiment 2

An embodiment of the present invention further provides a terminal, the terminal can execute the method described in Embodiment 1. The illustration that has already been described will not be repeated herein. The modules or units in the terminal can be codes stored in a memory that can be executed by a processor, the memory and the processor can be, but not limited to, located in the terminal. The device can also be implemented by other manners, which will not be described in detail herein.

Figure 3:
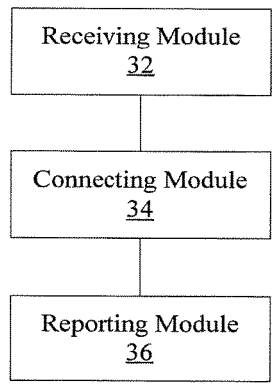
FIG. 3 is a flow diagram of an optional terminal for reporting PLMN according to an embodiment of the present invention.

In an alternative embodiment, an embodiment of the present invention further provides a terminal for reporting PLMN, FIG. 3 is a flow diagram of an optional terminal for reporting PLMN according to an embodiment of the present invention. As shown in FIG. 3, the terminal for reporting PLMN includes:

1) a receiving module 32, configured to receive a PLMN identifier list sent by a network-side access device;

2) a connecting module 34, configured to select a first PLMN identifier from the PLMN identifier list, so as to connect with the network-side access device;

3) a reporting module 36, configured to, after the terminal is connected with the network-side access device, label a second PLMN identifier preset in the terminal as a selected PLMN identifier and report the selected PLMN identifier to the network-side access device, the first PLMN identifier is different from the second PLMN identifier.

Alternatively, in the present embodiment, the above terminal for reporting PLMN can be applied to, but is not limited to, a network sharing process, through sharing a PLMN identifier by multiple operators, when the terminal receives the PLMN list by the receiving module 32 and accesses the network-side access device through selecting the first PLMN identifier by the connecting module 34, the first PLMN identifier can be shared by different operators, and the preset second PLMN identifier is reported by the reporting module 36, so that the terminal can interact with the core network corresponding to the second PLMN identifier, thereby solving the technical problem of limitation of operation on PLMN reporting in the prior art, extending the range of the reported PLMN identifier that can be selected by the terminal, increasing the number of operators that can be connected by the terminal, and satisfying the needs of increasing number of virtual operators in the prior art. Alternatively, in the above embodiment, the first PLMN identifier can be configured by the core network or the operator and maintenance center, which is not limited herein.

It should be noted that, the above manner can allow multiple operators to share a PLMN identifier, which not only increases the number of operators that can be connected by the terminal, but also does not increase the operation complexity of the reporting operation, thereby achieving a high efficient PLMN reporting so that the terminal can interact with the core network corresponding to the PLMN, under the condition that the number of the virtual operators is increasing continuously.

Alternatively, in the present embodiment, the above connecting module 34 has multiple implementing manners, in an alternative embodiment, the connecting module 34 can include: an access unit, configured to select a first PLMN identifier from the PLMN identifier list according to a preset priority, so as to access the network-side access device. By adopting such a manner that the access unit presets a PLMN identifier priority, it is convenient for the connecting module 34 to identify the first PLMN identifier, and perform selection and access.

In the above embodiment, the first PLMN identifier can be configured by the core network or the operator and maintenance center (O&M), which is not limited herein.

Alternatively, in the present embodiment, there is a plurality of implementing manners for the reporting module 36. Two optional implementing manners are taken as examples to illustrate the implementation of the reporting module 36.

In an alternative embodiment, the reporting module 36 can, but is not limited to, include a first setting unit, configured to set a preset bit in the reporting signaling satisfying a preset format for indicating the selected PLMN identifier as a specific value, the specific value is configured to indicate the position of the second PLMN identifier in the signaling; a first reporting unit, configured to report the signaling carrying the second PLMN identifier and the preset bit to the network-side access device. The reporting unit reports the selected second PLMN identifier to the network-side access device, thereby achieving the conversion from accessing the network-side access device by the connecting module 34 using the first PLMN identifier to communicating with the network by the reporting module 36 using the second PLMN identifier. Through setting a specific value for the preset bit of the reporting signaling by the first setting unit, the network-side is indicated that the terminal will use the selected second PLMN identifier, and multiplex the reporting signaling, so as to indicate the position of the second identifier, thereby saving system resources.

For the above optional embodiments, the position of the second PLMN identifier in the signaling indicated by the specific value can include, but not limited to, a position after the preset bit in the reporting signaling, the position is configured to identify the reported second PLMN identifier. By using the position after the preset bit in the reporting signaling, the second PLMN identifier selected by the terminal is identified, thereby achieving multiplex of the reporting signaling, and saving system resources.

In another alternative embodiment, the reporting module 36 can, but is not limited to, include a second setting unit, configured to set the second PLMN identifier selected by the terminal at an extensible position in the reporting signaling satisfying a preset format; a second reporting unit, configured to report the signaling carrying the second PLMN identifier to the network-side access device. Through extending the extensible position of the reporting signaling by the second setting unit, and identify the second PLMN identifier at the extensible position, the network-side access device can directly acquire the second PLMN identifier selected by the terminal and, at the same time, multiplex of the reporting signaling is achieved, thereby saving system resources.

In the above embodiments, the first PLMN identifier can be, but not limited to, a public PLMN identifier, configured to allow access of a terminal identified by at least two operators, so that different operators can use a same PLMN identifier, thereby solving the problem that when there are more than 6 operators, there is no enough space in the PLMN list.

Embodiment 3

It should be noted that, Embodiment 3 and Embodiment 4 will be illustrated at network side.

Figure 4:
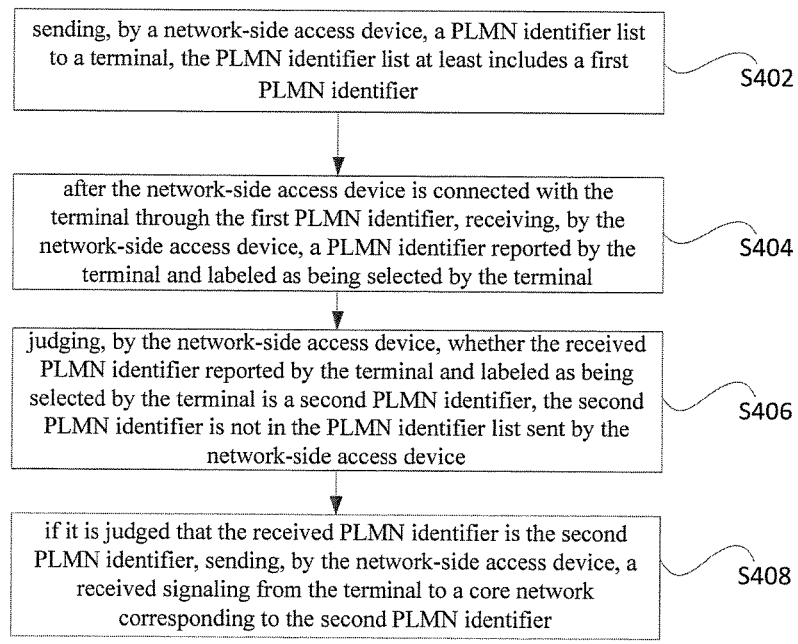
FIG. 4 is a flow diagram of another optional method for reporting PLMN according to an embodiment of the present invention.

An alternative embodiment of the present invention further provides a method for reporting PLMN, FIG. 4 is a flow diagram of another alternative method for reporting PLMN according to an embodiment of the present invention, as shown in FIG. 4, the process includes:

Step S402, sending, by a network-side access device, a PLMN identifier list to a terminal, the PLMN identifier list at least includes a first PLMN identifier;

Step S404, after the network-side access device is connected with the terminal through the first PLMN identifier, receiving, by the network-side access device, a PLMN identifier reported by the terminal and labeled as being selected by the terminal;

Step S406, judging, by the network-side access device, whether the received PLMN identifier reported by the terminal and labeled as being selected by the terminal is a second PLMN identifier, the second PLMN identifier is not in the PLMN identifier list sent by the network-side access device;

Step S408, if it is judged that the received PLMN identifier is the second PLMN identifier, sending, by the network-side access device, a received signaling from the terminal to a core network corresponding to the second PLMN identifier.

Alternatively, in the present embodiment, the above method for reporting PLMN can be applied to, but is not limited to, a network sharing process, through sharing a PLMN identifier by multiple operators, after the network-side access device is connected with the terminal by selecting the first PLMN identifier, judging whether the PLMN identifier selected and reported by the terminal is the second PLMN identifier, the second PLMN identifier is not in the PLMN identifier list sent by the network-side access device, thereby solving the technical problem of limitation of operation on PLMN reporting in the prior art, extending the range of the reported PLMN identifier that can be selected by the terminal through selecting the first PLMN identifier and reporting the second PLMN identifier, increasing the number of operators that can be connected by the terminal, and satisfying the needs of increasing number of virtual operators in the prior art. Alternatively, in the above embodiment, the first PLMN identifier can be configured by the core network or the operator and maintenance center, which is not limited herein.

In Step S402, the network-side access device can broadcast the PLMN identifier list in a system message. The PLMN identifier list can be configured by the core network or O&M.

In Step S404, the network-side access device can store the first PLMN identifier and the second PLMN identifier.

In an alternative embodiment, judging, by the network-side access device, the PLMN identifier reported by the terminal in step S406 can be implemented in a manner as follows: receiving and analyzing, by the network-side access device, a signaling satisfying a preset format reported by the terminal, so as to acquire a specific value on a preset bit indicating a position of the second PLMN identifier in the signaling. Through acquiring the specific value in the signaling, it is acquired that whether the PLMN identifier reported by the terminal is the first PLMN identifier, and the position of the PLMN identifier reported by the terminal is acquired.

In the above alternative embodiment, the position of the second PLMN identifier in the signaling indicated by the specific value can include a position after the preset bit in the reporting signaling, the position is configured to identify the reported second PLMN identifier, so that the network-side access device acquires the second PLMN identifier according to the specific value, and achieve communication between the core network and the terminal according to the second PLMN identifier.

In an alternative embodiment, in step S406, judging, by the network-side access device, the PLMN identifier reported by the terminal can be implemented in a manner as follows: receiving and analyzing, by the network-side access device, a signaling satisfying a preset format reported by the terminal, so as to acquire the second PLMN identifier reported by the terminal at an extensible position of the signaling. The network-side access device can directly acquire the second PLMN identifier reported by the terminal.

In the above embodiments, the network-side access device can send the PLMN identifier list on the unlicensed frequency band, so that operating cost can be saved.

Embodiment 4

An embodiment of the present invention further provides a network-side access device, the device can execute the method described in Embodiment 3. The illustration that has already been described will not be repeated herein. The modules or units in the device can be codes stored in a memory that can be executed by a processor, the memory and the processor can be, but not limited to, located in the device. The device can also be implemented by other manners, which will not be described in detail herein.

Figure 5:
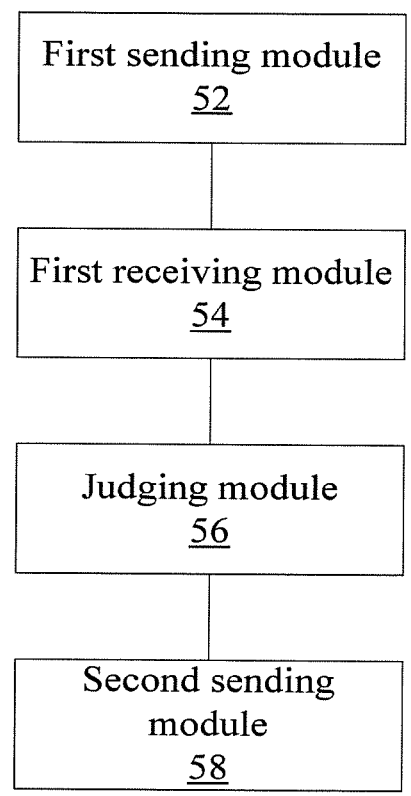
FIG. 5 is a flow diagram of another optional network-side access device for reporting PLMN according to an embodiment of the present invention.

An alternative embodiment of the present invention further provides a network-side access device for reporting PLMN, FIG. 5 is a flow diagram of another optional network-side access device for reporting PLMN according to an embodiment of the present invention; as shown in FIG. 5, the device includes:

1) a first sending module 52, configured to send a PLMN identifier list to a terminal, the PLMN identifier list at least includes a first PLMN identifier;

2) a first receiving module 54, configured to, after the network-side access device is connected with the terminal through the first PLMN identifier, receive a PLMN identifier reported by the terminal and labeled as being selected by the terminal;

3) a judging module 56, configured to judge whether the received PLMN identifier reported by the terminal and labeled as being selected by the terminal is a second PLMN identifier, the second PLMN identifier is not in the PLMN identifier list sent by the first sending module;

4) a second sending module 58, configured to, after the judging module 56 judges that the received PLMN identifier is the second PLMN identifier, send a received signaling from the terminal to a core network corresponding to the second PLMN identifier.

Alternatively, in the present embodiment, the above network-side access device for reporting PLMN can be applied to, but is not limited to, a network sharing process, through sharing a PLMN identifier by multiple operators, the network-side access device can achieve that through the first sending module 52 sending the PLMN identifier list, the first receiving module 54 receiving the PLMN identifier selected and reported by the terminal, judging the second PLMN identifier by the judging module 56, then through the second sending module 58 sending the signaling from the terminal to a core network corresponding to the second PLMN identifier, wherein the second PLMN identifier is noted in the PLMN list sent by the first sending module 52, thereby solving the technical problem of limitation of operation on PLMN reporting in the prior art, extending the range of the reported PLMN identifier that can be selected by the terminal through selecting the first PLMN identifier and reporting the second PLMN identifier, increasing the number of operators that can be connected by the terminal, and satisfying the needs of increasing number of virtual operators in the prior art. Alternatively, in the above embodiment, the first PLMN identifier can be configured by the core network or the operator and maintenance center, which is not limited herein.

In an alternative embodiment, the judging module 56 can include: a first analyzing unit, configured to receive and analyze a signaling satisfying a preset format reported by the terminal, so as to acquire a specific value on a preset bit indicating a position of the second PLMN identifier in the signaling. Through the first analyzing unit acquiring the specific value in the signaling, it is acquired that whether the PLMN identifier reported by the terminal is the first PLMN identifier, and the position of the PLMN identifier reported by the terminal is acquired.

In the above alternative embodiment, the position of the second PLMN identifier in the signaling indicated by the specific value can include a position after the preset bit in the reporting signaling, the position is configured to identify the reported second PLMN identifier, so that the first acquiring unit acquires the second PLMN identifier according to the specific value, and the core network and the terminal can be communicated with each other according to the second PLMN identifier.

In an alternative embodiment, the judging module 56 can also be achieved by the following units: a second analyzing unit, configured to receive and analyze a signaling satisfying a preset format reported by the terminal, so as to acquire a second PLMN identifier reported by the terminal on an extensible position of the signaling. In the present embodiment, the second analyzing unit can directly acquire the second PLMN identifier.

In the above embodiments, the first sending module can send the PLMN identifier list on the unlicensed frequency band, so that operating cost can be saved.

An alternative embodiment of the present invention will be illustrated with reference to a specific implementation environment, the example as follows can be applied to any one of Embodiments 1-4.

Figure 6:
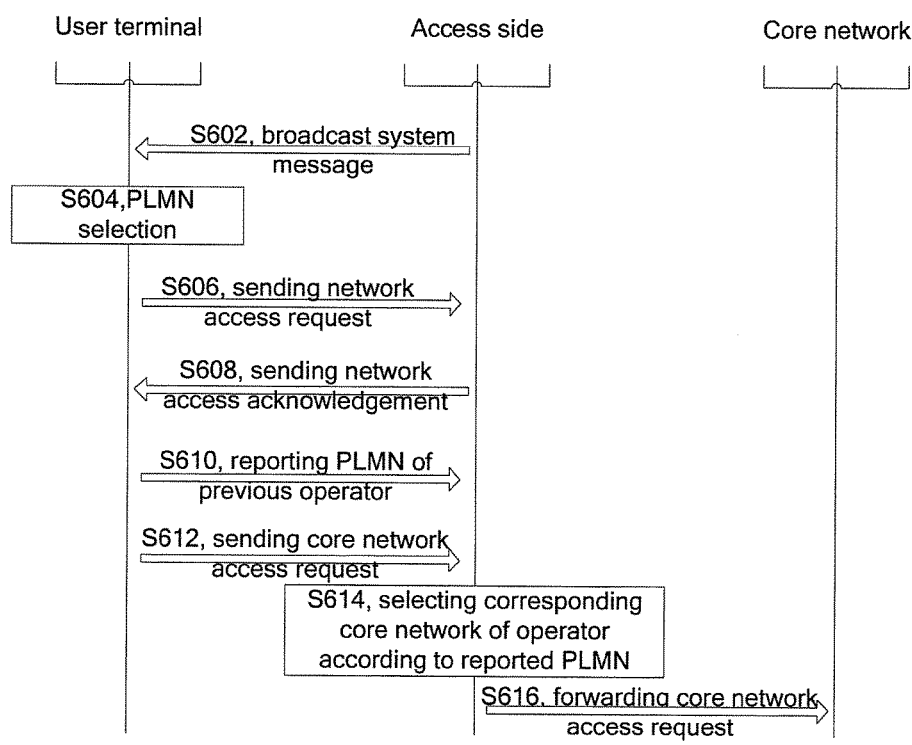
FIG. 6 is a flow diagram of still another optional method for reporting PLMN according to an embodiment of the present invention.

FIG. 6 is a flow diagram of still another alternative method for reporting PLMN according to an embodiment of the present invention. For example, at a certain frequency band, a company A deploys a network-side access device for sharing (assuming that the device is an LIE base station), operators 1, 2, 3, 4, 5, 6, 7, 8 (respectively corresponding to PLMN-1, 2, 3, 4, 5, 6, 7, 8) can all share the network-side access device, so as to access to their own core network. As shown in FIG. 6, the method includes steps as follows:

Step S602, broadcasting, by a company A, a PLMN identifier of the company A in a system message of a network-side access device of the company A, assuming as PLMN-A. The format of the signaling is:

```
SystemInformatonBlockType1 ::=        SEQUENCE {
    cellAccessRelatedInfo                 SEQUENCE {
        plmn-IdentityList                     PLMN-IdentityList,
        trackingAreaCode                      TrackingAreaCode,
        cellIdentity                          CellIdentity,
        cellBarred                                ENUMERATED {barred, notBarred},
        intraFreqReselection                  ENUMERATED {allowed, notAllowed},
        csg-Indication                            BOOLEAN,
        csg-Identity                          CSG-Identity            OPTIONAL -- Need
OR
    },
```

```
            cellSelectionInfo          SEQUENCE {
                q-RxLevMin                   Q-RxLevMin,
                q-RxLevMinOffset             INTEGER (1..8)    OPTIONAL --  Need
OP
            },
            p-Max                        P-Max              OPTIONAL,
  -- Need OP
                freqBandIndicator            FreqBandIndicator,
                schedulingInfoList           SchedulingInfoList,
                tdd-Config              TDD-Config              OPTIONAL,-- Cond TDD
                si-WindowLength              ENUMERATED {
                                                 ms1, ms2, ms5, ms10, ms15, ms20,
                                                 ms40},
                systemInfoValueTag           INTEGER (0..31),
                nonCriticalExtension    SystemInformationBlockType1-v890-IEs
OPTIONAL
        }
    PLMN-IdentityList ::=              SEQUENCE (SIZE 1) OF PLMN-IdentityInfo
    PLMN-IdentityInfo ::=              SEQUENCE {
        plmn-Identity                      PLMN-A,
        cellReservedForOperatorUse         ENUMERATED {reserved, notReserved}
    }
```

The underlined portion shows the carrying manner of PLMN-A in the signaling.

Step S604, reading, by a user terminal supporting network sharing, when performing PLMN selection and cell searching, a PLMN list (i.e., PLMN identifier list) in a system broadcast message of a currently searched cell, if the PLMN list includes a common PLMN (i.e., a first PLMN identifier, in the present embodiment PLMN-A), then selecting a cell administrated by the PLMN-A;

Step S606, starting, by the user terminal, a normal random access process, and sending a network access request to the network-side;

Step S608, if the random access process is succeeded, i.e., the terminal successfully receives a network access acknowledge message in the random access process, executing step S610, if not, executing step S604, re-selecting a PLMN identifier;

Step S610, sending, by the user terminal, a PLMN identifier of a previous operator of the user terminal (a second PLMN identifier) to the network-side access device through an RRC signaling, the format of the RRC signaling is shown as follows:

```
RRCConnectionSetupComplete-r8-IEs ::= SEQUENCE {
    selectedPLNM-Identity      INTEGER(1..maxPLMN-r11),
    registeredMME              RegisteredMME           OPTIONAL,
    dedicatedInfoNAS           DedicatedInfoNAS,
    nonCritical Extension      RRCConnectionSetupComplete-v8a0-IEs
OPTIONAL
}
```

The underlined portion shows the position of the PLMN identifier of the previous operator of the user terminal in the signaling.

Alternatively, in the present embodiment, at least one of the following manners for reporting PLMN identifier can be adopted:

Manner One: the user terminal can set the underlined portion as 111 ("111" is binary, which represents 7 in decimalism), i.e., an invalid value. After the network-side receives the 111, it will consider that the following bits include the PLMN identifier of a previous operator of the user terminal, rather than its original meaning, for example, the signaling format as follows:

```
RRCConnectionSetupComplete-r8-IEs ::= SEQUENCE {
    selectedPLMN-Identity      INTEGER(7),
    registeredMME              RegisteredMME           OPTIONAL,
    dedicatedInfoNAS           DedicatedInfoNAS,
    nonCriticalExtension       RRCConnectionSetupComplete-v8a0-IEs
OPTIONAL
}
    RegisteredMME ::=          SEQUENCE {
        plmn-Identity              PLMN-Identity
OPTIONAL,
        mmegi                      BIT STRING (SIZE (16)),
        mmec                       MMEC
    }
```

In such a signaling format, after the network-side receives the 111, it represents that the user terminal has selected to report the PLMN of the previous operator of the user terminal, shown as the position of the first underlined portion of the signaling format. The position of the second underlined portion of the signaling format shows the PLMN of the previous operator of the user terminal, rather than the PLMN of the operator of the network-side access device that the user terminal is accessed, and the two parameters following the position of the second underlined portion of the signaling format, i.e., MMEGI, MMEC are considered as invalid.

Manner Two: extending the RRC signaling of the previous version adopting non-critical extension, so as to report the PLMN identifier of the previous operator of the user Step S612, sending, by the user terminal, an access request to the core network;

Step S614, selecting, by the network-side access device, an operator core network according to the PLMN identifier reported by the user terminal;

Step S616, forwarding, by the network-side, the core network access request of the user terminal to a corresponding core network, and in the following process, sending information sent to the core network by the corresponding user terminal to the corresponding core network.

In the above alternative embodiment, after the user terminal reads the PLMN list broadcast by the network-side and performs selection, the user terminal enters into a cell access process, after completing the cell access process, the user terminal reports the PLMN identifier of the previous operator of the user terminal rather than the PLMN selected by the user terminal in the broadcast cell system message, so as to support more operators, and thus provide possibility for more virtual operators and Internet content provider to participate in network sharing.

In the LIE system, a user has two states in the wireless access network side, respectively RRC CONNECTED state and RRC IDLE state. The former represents that the user is communicating in the system, and is in an activated state, and the latter represents that the user is in an idle state after completing communication with the wireless access network. The above alternative embodiment describes a method for reporting PLMN when the user terminal is in an RRC IDLE state. Hereinafter, a method for reporting PLMN when the user terminal is in an RRC CONNECTED state with a working manner of participating in network sharing will be described.

In the present alternative embodiment, the user terminal is in an RRC CONNECTED state, that is, the user is served by a network. When the user moves to a coverage area of a sharing network, the network serving the user delivers the user to the sharing network for further service. In the prior art, there are two manners to achieve the handoff, i.e., cell handoff or redirection. Cell handoff refers to that after the previous serving cell negotiates with the target cell, sending a handoff command to the user terminal to indicate the user terminal to access the designated cell. Redirection refers to that the previous serving cell does not need to negotiate with the target cell, but only disconnects the connection with the user terminal and sends a redirection instruction, then the user selects a cell satisfying certain conditions according to the redirection instruction.

If the handoff manner is adopted, the previous base station transmits a globally unique MME identifier (Globally Unique MME Identifier, GUMMEI) through an X2 interface between cells to notify the target base station the PLMN identifier of the previous operator, after a successful handoff, the target base station forwards the data and signaling sent to the core network by the user terminal to a core network of a corresponding operator according to the PLMN identifier indicated by the GUMMEI.

It the redirection manner is adopted, the previous base station releases the current RRC connection and indicates the user terminal to perform cell searching and PLMN selection at a certain frequency. The following steps can be referred to the PLMN reporting process described in the above embodiment that the user terminal is in the RRC IDLE state.

It should be noted that, for the above method embodiments, for ease of description, they are described as a combination of a series of actions/steps. However, for those skilled in the art, the present invention is not limited to the actions/steps sequence described, since some of the steps can be implemented by other sequences or implemented at the same time. Moreover, those skilled in the art shall understand, the embodiments described in the description are preferred embodiments, the actions/steps and modules used therein may not be definitely necessary in the present invention.

In the above embodiments, each embodiment may have its own focus, the parts which are not described in detail can be referred to relevant description in other embodiments.

In the embodiments provided by the present invention, it should be noted that, the device disclose can be implemented in other manners. For example, the device embodiments are only exemplary, e.g., division of units is only a logical division, when being implemented, there may be other division manners, for example, multiple units or assemblies can be combined or integrated into another system, or some of the features can be omitted or not executed. In addition, the shown or discussed mutual coupling or direct coupling or communication connection can be implemented through indirect coupling or communication connection between interfaces, devices or units, which can be electrically or in other forms.

The units illustrated as separated components can be or not be physically separated, components described as units can be or not be physical units, which can be located at a same place, or distributed in multiple network units. The object of the embodiments of the present invention can be implemented by a part or all of the units according to actual demands.

Furthermore, the functional units in embodiments of the present invention can be integrated in a processing unit, or can be physically presented as individual units, or two or more of them can be integrated in a same unit. The integrated unit can be implemented by hardware, or by software functional unit.

When the integrated unit, which is implemented by software functional unit, is being sold or used as a separated product, it can be stored in a computer readable storage medium. Based on such understanding, the essence of the technical solutions of the present invention or the parts contributing to the prior art, or all or part of the technical solutions can be implemented by software product, the software product is stored in a storage medium, which includes a plurality of instructions, so that a computer device (PC, mobile terminal, server or network device) can execute all or part of the steps in each method embodiment. The above-mentioned storage medium includes: USB-disk, read-only memory (ROM), random access memory (RAM), mobile hard-disk, magnetic disk, optical disk, or any other mediums that can store programming codes.

The above are merely preferred embodiments of the present invention, which are not used to limit the present invention. For those skilled in the art, the present invention may have many modifications and variations. Therefore, any modification, equivalent replacement, improvement without departing from the spirit and principle of the present invention shall be included in the protection scope of the present invention.

What is claimed is:

1. A method for reporting public land mobile network (PLMN), comprising steps of:
   receiving, by a terminal, a PLMN identifier list sent by a network-side access device;
   selecting, by the terminal, a first PLMN identifier from the PLMN identifier list, so as to connect with the network-side access device; and
   after the terminal is connected with the network-side access device, labeling, by the terminal, a second PLMN identifier preset in the terminal as a selected PLMN identifier and reporting the selected PLMN identifier to the network-side access device for the network-side access device to select a corresponding core network of operator according to the selected PLMN identifier, wherein the first PLMN identifier is different from the second PLMN identifier.

2. The method according to claim 1, wherein the step of selecting, by the terminal, a first PLMN identifier from the PLMN identifier list, so as to connect with the network-side access device, comprises: selecting, by the terminal, a first PLMN identifier from the PLMN identifier list according to a preset priority, so as to access the network-side access device.

3. The method according to claim 1, wherein the step of labeling, by the terminal, a second PLMN identifier preset in the terminal as a selected PLMN identifier and reporting the selected PLMN identifier to the network-side access device, comprises:
setting, by the terminal, a preset bit in a reporting signaling satisfying a preset format for indicating the selected PLMN identifier as a specific value, wherein the specific value is configured to indicate a position of the second PLMN identifier in the signaling; and
reporting, by the terminal, the signaling carrying the second PLMN identifier and the preset bit to the network-side access device.

4. The method according to claim 3, wherein the position of the second PLMN identifier in the signaling indicated by the specific value comprises: a position after the preset bit in the reporting signaling, wherein the position is configured to identify the reported second PLMN identifier.

5. The method according to claim 1, wherein the step of labeling, by the terminal, a second PLMN identifier preset in the terminal as a selected PLMN identifier and reporting the selected PLMN identifier to the network-side access device, comprises:
setting, by the terminal, the selected second PLMN identifier at an extensible position in a reporting signaling satisfying a preset format; and
reporting, by the terminal, the signaling carrying the second PLMN identifier to the network-side access device.

6. The method according to claim 1, wherein the first PLMN identifier is configured to allow access of a terminal which is identified by at least two operators.

7. A method for reporting public land mobile network (PLMN), comprising steps of:
sending, by a network-side access device, a PLMN identifier list to a terminal, wherein the PLMN identifier list at least includes a first PLMN identifier;
after the network-side access device is connected with the terminal through the first PLMN identifier, receiving, by the network-side access device, a PLMN identifier reported by the terminal and labeled as being selected by the terminal;
judging, by the network-side access device, whether the received PLMN identifier reported by the terminal and labeled as being selected by the terminal is a second PLMN identifier, wherein the second PLMN identifier is not in the PLMN identifier list sent by the network-side access device; and
when the received PLMN identifier is the second PLMN identifier, selecting, by the network-side access device, a corresponding core network of operator according to the second PLMN identifier and sending, by the network-side access device, a received signaling from the terminal to the core network.

8. The method according to claim 7, wherein the step of judging, by the network-side access device, the PLMN identifier reported by the terminal, comprises:
receiving and analyzing, by the network-side access device, a signaling satisfying a preset format reported by the terminal, so as to acquire a specific value on a preset bit indicating a position of the second PLMN identifier in the signaling.

9. The method according to claim 8, wherein the position of the second PLMN identifier in the signaling indicated by the specific value comprises: a position after the preset bit in the reporting signaling, wherein the position is configured to identify the reported second PLMN identifier.

10. The method according to claim 7, wherein the step of judging, by the network-side access device, the PLMN identifier reported by the terminal, comprises:
receiving and analyzing, by the network-side access device, a signaling satisfying a preset format reported by the terminal, so as to acquire the second PLMN identifier reported by the terminal at an extensible position of the signaling.

11. The method according to claim 7, wherein the PLMN identifier list is sent by the network-side access device on an unlicensed frequency band.

12. A terminal for reporting public land mobile network (PLMN), comprising:
a memory storing a plurality of codes; and
a processor configured to execute the plurality of codes in the memory to:
receive a PLMN identifier list sent by a network-side access device;
select a first PLMN identifier from the PLMN identifier list, so as to connect with the network-side access device; and
after the terminal is connected with the network-side access device by the processor, label a second PLMN identifier preset in the memory as a selected PLMN identifier and report the selected PLMN identifier to the network-side access device for the network-side access device to select a corresponding core network of operator according to the selected PLMN identifier, wherein the first PLMN identifier is different from the second PLMN identifier.

13. The terminal according to claim 12, wherein when selecting a first PLMN identifier from the PLMN identifier list, so as to connect with the network-side access device, the processor is further configured to the plurality of codes in the memory to:
select a first PLMN identifier from the PLMN identifier list according to a preset priority, so as to access the network-side access device.

14. The terminal according to claim 12, wherein when labeling a second PLMN identifier preset in the memory as a selected PLMN identifier and reporting the selected PLMN identifier to the network-side access device, the processor is further configured to the plurality of codes in the memory to:
set a preset bit in a reporting signaling satisfying a preset format for indicating the selected PLMN identifier as a specific value, wherein the specific value is configured to indicate a position of the second PLMN identifier in the signaling; and
report the signaling carrying the second PLMN identifier and the preset bit to the network-side access device.

15. The terminal according to claim 14, wherein the position of the second PLMN identifier in the signaling indicated by the specific value comprises: a position after the preset bit in the reporting signaling, wherein the position is configured to identify the reported second PLMN identifier.

16. The terminal according to claim 12, wherein when labeling a second PLMN identifier preset in the memory as a selected PLMN identifier and reporting the selected PLMN identifier to the network-side access device, the processor is further configured to the plurality of codes in the memory to:
set the second PLMN identifier at an extensible position in a reporting signaling satisfying a preset format; and
report the signaling carrying the second PLMN identifier to the network-side access device.

17. The terminal according to claim 12, wherein the first PLMN identifier is configured to allow access of a terminal which is identified by at least two operators.

18. A network-side access device for reporting public land mobile network (PLMN), comprising:
- a memory storing a plurality of codes; and
- a processor configured to execute the plurality of codes in the memory to:
- send a PLMN identifier list to a terminal, wherein the PLMN identifier list at least includes a first PLMN identifier;
- after the network-side access device is connected with the terminal through the first PLMN identifier, receive a PLMN identifier reported by the terminal and labeled as being selected by the terminal;
- judge whether the received PLMN identifier reported by the terminal and labeled as being selected by the terminal is a second PLMN identifier, wherein the second PLMN identifier is not in the sent PLMN identifier list; and
- after judging that the received PLMN identifier is the second PLMN identifier, select a corresponding core network of operator according to the second PLMN identifier and send a received signaling from the terminal to the core network.

19. The network-side access device according to claim 18, wherein when judging whether the received PLMN identifier reported by the terminal and labeled as being selected by the terminal is a second PLMN identifier, the processor is further configured to execute the plurality of codes in the memory to:
- receive and analyze a signaling satisfying a preset format reported by the terminal, so as to acquire a specific value on a preset bit indicating a position of the second PLMN identifier in the signaling.

20. The network-side access device according to claim 19, wherein the position of the second PLMN identifier in the signaling indicated by the specific value comprises: a position after the preset bit in the reporting signaling, wherein the position is configured to identify the reported second PLMN identifier.

21. The network-side access device according to claim 18, wherein when judging whether the received PLMN identifier reported by the terminal and labeled as being selected by the terminal is a second PLMN identifier, the processor is further configured to execute the plurality of codes in the memory to:
- receive and analyze a signaling satisfying a preset format reported by the terminal, so as to acquire the second PLMN identifier reported by the terminal at an extensible position of the signaling.

22. The network-side access device according to claim 18, wherein the PLMN identifier list is sent by the network-side access device on an unlicensed frequency band.

* * * * *